United States Patent
Son et al.

(10) Patent No.: US 12,451,646 B2
(45) Date of Patent: Oct. 21, 2025

(54) POWER SUPPLY DEVICE OF MOTOR-DRIVEN CHILD SEAT FOR VEHICLE

(71) Applicants: Hyundai Motor Company, Seoul (KR); Kia Corporation, Seoul (KR); Poled Co., Ltd., Chungcheongnam-do (KR)

(72) Inventors: Byeong Seon Son, Seoul (KR); Tae Hoon Lee, Gyeonggi-do (KR); Seung Hyun Kim, Daejeon (KR); Ji Hwan Kim, Seoul (KR); Sang Hoon Park, Incheon (KR); Sang Ho Kim, Incheon (KR); Seon Chae Na, Gyeonggi-do (KR); Hyun Tae Lee, Chungcheongnam-do (KR); Won Ho Chang, Chungcheongnam-do (KR); Jeong In Baek, Gyeonggi-do (KR); In Ju Lee, Seoul (KR)

(73) Assignees: Hyundai Motor Company, Seoul (KR); Kia Corporation, Seoul (KR); Poled Co., Ltd., Chungcheongnam-Do (KR)

(*) Notice: Subject to any disclaimer, the term of this patent is extended or adjusted under 35 U.S.C. 154(b) by 329 days.

(21) Appl. No.: 18/084,189

(22) Filed: Dec. 19, 2022

(65) Prior Publication Data
US 2023/0361505 A1    Nov. 9, 2023

(30) Foreign Application Priority Data

May 3, 2022    (KR) ........................ 10-2022-0054525

(51) Int. Cl.
*H01R 13/627*    (2006.01)
*B60N 2/28*    (2006.01)
(Continued)

(52) U.S. Cl.
CPC ....... *H01R 13/6272* (2013.01); *B60N 2/2893* (2013.01); *B60R 16/03* (2013.01);
(Continued)

(58) Field of Classification Search
CPC .... B60N 2/2821; B60N 2/2893; B60R 16/03; B60N 2/2875; H01R 13/4532;
(Continued)

(56) References Cited

U.S. PATENT DOCUMENTS

6,419,199 B1 *   7/2002   Skofljanec ............. B60N 2/289
                                                24/633
7,224,270 B2 *   5/2007   Patterson ............. B60N 2/2812
                                                280/801.1
(Continued)

*Primary Examiner* — Gary F Paumen
(74) *Attorney, Agent, or Firm* — Fox Rothschild LLP (57) ABSTRACT

A power supply device of a motor-driven child seat for a vehicle is provided. The motor-driven child seat can be easily mounted and fixed to a rear seat by adopting a method where a latch of the motor-driven child seat is fastened to an anchor of the rear seat, and power can be easily supplied to power consuming components, i.e., an electric mechanism including a motor, a ventilation system, and a heating system, by automatically fastening male-female connectors for supplying power, especially when the motor-driven child seat is fixedly mounted on the rear seat.

16 Claims, 6 Drawing Sheets

(51) Int. Cl.
*B60R 16/03* (2006.01)
*H01R 13/453* (2006.01)
*H01R 13/50* (2006.01)
*H01R 13/502* (2006.01)

(52) U.S. Cl.
CPC ....... *H01R 13/4536* (2013.01); *H01R 13/502* (2013.01); *H01R 13/6275* (2013.01); *B60N 2/2875* (2013.01); *H01R 13/50* (2013.01); *H01R 2201/26* (2013.01)

(58) Field of Classification Search
CPC ............ H01R 13/6272; H01R 13/4536; H01R 13/502; H01R 13/6275; H01R 2201/26; H01R 13/50
USPC .......................................................... 439/345
See application file for complete search history.

(56) References Cited

U.S. PATENT DOCUMENTS

| | | | | |
|---|---|---|---|---|
| 7,288,009 B2 * | 10/2007 | Lawrence | ............... | B60N 2/268 439/824 |
| 7,439,866 B2 * | 10/2008 | Wallner | ............... | B60N 2/0025 180/271 |
| 8,007,043 B1 * | 8/2011 | Vuong | ................. | B60N 2/2821 297/256.16 |
| 8,047,888 B1 * | 11/2011 | Seymore | ............... | A47D 9/016 472/36 |
| 8,430,451 B1 * | 4/2013 | Heinz | .................. | B60N 2/5685 297/180.12 |
| 8,610,569 B2 * | 12/2013 | Lanta | .................. | B60N 2/0022 340/667 |
| 10,065,529 B1 * | 9/2018 | Miranda Nieto | .... | B60N 2/2887 |
| 11,358,499 B2 * | 6/2022 | Thomas | ................. | B60N 2/2809 |
| 11,603,018 B2 * | 3/2023 | Son | ...................... | B60N 2/2821 |
| 2007/0296254 A1 * | 12/2007 | Kahn | ................... | B60N 2/2821 297/256.16 |

* cited by examiner

POWER SUPPLY DEVICE OF MOTOR-DRIVEN CHILD SEAT FOR VEHICLE

CROSS REFERENCE TO RELATED APPLICATION

The present application claims under 35 U.S.C. § 119(a) the benefit of Korean Patent Application No. 10-2022-0054525, filed May 3, 2022, the entire contents of which are incorporated herein for all purposes by this reference.

BACKGROUND

Technical Field

The present disclosure relates to a power supply device of a motor-driven child seat for a vehicle. More particularly, the present disclosure relates to a power supply device of a motor-driven child seat for a vehicle, which enables power to be easily supplied to various power consuming components of a motor-driven child seat.

Background

Generally, as laws are enacted requiring that a child seat for a vehicle should be installed when a child rides in the vehicle, the demand of the child seats is increasing.

However, a conventional manual child seat is problematic in that it is difficult to adjust a seat position, so an adult may feel uncomfortable when he or she holds a child and seats the child on the child seat, and a child may refuse to sit on the child seat or may feel uncomfortable while sitting thereon.

Further, a conventional child seat is problematic in that it should be mounted and fixed using a belt or the like after the child seat is seated on a rear seat, so it is inconvenient and time-consuming to install the child seat.

Furthermore, a conventional child seat is problematic in that it usually does not have a ventilation system for cooling or a heating system for heating, so a child sitting on the child seat may feel hot in summer, and a child sitting on the child seat may feel cold in winter.

In order to solve these existing problems, a motor-driven child seat equipped with an electric mechanism for adjusting various positions such as the reclining adjustment and swivel adjustment of the child seat, a ventilation system for cooling, and a heating system for heating is being developed and manufactured.

However, even if the motor-driven child seat is manufactured, power should be easily supplied to various power consuming components of the motor-driven child seat for the purpose of practical use.

Thus, there is needed a power supply device for easily supplying power to the electric mechanism including a motor, the ventilation system, and the heating system, which are the power consuming components, in a state in which the motor-driven child seat is easily mounted and fixed to the rear seat or the like.

SUMMARY

Accordingly, the present disclosure has been made keeping in mind the above problems occurring in the related art, and an objective of the present disclosure is to provide a power supply device of a motor-driven child seat for a vehicle, in which the motor-driven child seat can be easily mounted and fixed to a rear seat by adopting a method where a latch of the motor-driven child seat is fastened to an anchor of the rear seat, and in which power can be easily supplied to power consuming components, i.e., an electric mechanism including a motor, a ventilation system, and a heating system, by automatically fastening male-female connectors for supplying power, especially when the motor-driven child seat is fixedly mounted on the rear seat.

The present disclosure provides a power supply device of a motor-driven child seat for a vehicle, the power supply device including a latch mounted on a rear portion of the motor-driven child seat; a male connector installed in a first connector housing formed on a side of the latch; a case configured to allow the latch and the first connector housing to enter and exit, and configured to be mounted on a rear seat; an anchor installed at a predetermined position of the case; and a female connector mounted in the case and positioned on a side of the anchor, wherein, when the latch and the first connector housing are inserted into the case, the latch is fastened to the anchor, and simultaneously the male connector is fastened to the female connector.

The case may include a lower cover having an opening formed in a front portion thereof, an anchor exposure hole formed in a bottom thereof, and hinge fastening grooves formed on both sidewalls of a rear portion thereof; and an upper cover having an access hole formed in a front portion thereof, and stacked on the lower cover to be coupled thereto.

Preferably, an upper door and a lower door may be mounted, respectively, on an upper portion and a lower portion of the opening of the lower cover to be opened or closed by a rotating shaft having a return spring.

Further, an anchor bracket may be mounted on the bottom of the lower cover, and an annular anchor mounted on the anchor bracket may be exposed through the anchor exposure hole.

Particularly, the second connector housing in which the female connector is embedded may be hingedly fastened to the hinge fastening groove of the lower cover.

The second connector housing may include a 2-1 connector housing and a 2-2 connector housing that are symmetrical to each other, a hinge pin may be formed on an outer surface of each of the 2-1 connector housing and the 2-2 connector housing to be fastened to the hinge fastening groove, and each of the connector housings may include an inner space into which the female connector is inserted and fastened.

Further, a fastening groove may be formed on an inner wall of the inner space, and a fastening protrusion fastened to the fastening groove may be formed on an outer surface of the female connector.

Furthermore, a locking pin may be formed on an upper portion of the 2-1 connector housing to protrude therefrom, and a locking end having a locking hole into which the locking pin is inserted and fastened may be formed on an upper portion of the 2-2 connector housing.

Furthermore, a locking spring locked and inserted into a locking groove formed in the bottom of the first connector housing may be mounted on the bottom of the second connector housing to protrude therefrom.

Preferably, a spring fixing groove into which a half of the locking spring in a widthwise direction is inserted and fastened may be formed in an inner surface of a lower end of each of the 2-1 connector housing and the 2-2 connector housing of the second connector housing.

As described above, the present disclosure provides the following effects.

First, a motor-driven child seat can be easily mounted and fixed to a rear seat by fastening a latch of the motor-driven child seat to an anchor of the rear seat, when the motor-driven child seat is seated on the rear seat.

Second, power can be easily supplied to power consuming components of a motor-driven child seat, i.e., an electric mechanism including a motor, a ventilation system, and a heating system, by automatically fastening a male connector positioned on a side of a latch to a female connector positioned on a side of an anchor, when the latch of the motor-driven child seat is fastened to the anchor of the rear seat.

Third, a process in which a latch of a motor-driven child seat is fastened to an anchor of a rear seat and a process in which a male connector for supplying power is fastened to a female connector are simultaneously performed in a one-touch manner, thus improving the convenience of installation and use of the motor-driven child seat.

In another embodiment, vehicles are provided that comprise an apparatus as disclosed herein.

BRIEF DESCRIPTION OF THE DRAWINGS

The above and other objectives, features, and other advantages of the present disclosure will be more clearly understood from the following detailed description when taken conjointly with the accompanying drawings, in which.

DETAILED DESCRIPTION OF THE INVENTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements.

Hereinafter, a preferred embodiment of the present disclosure will be described in detail with reference to the accompanying drawings.

Figure 1:
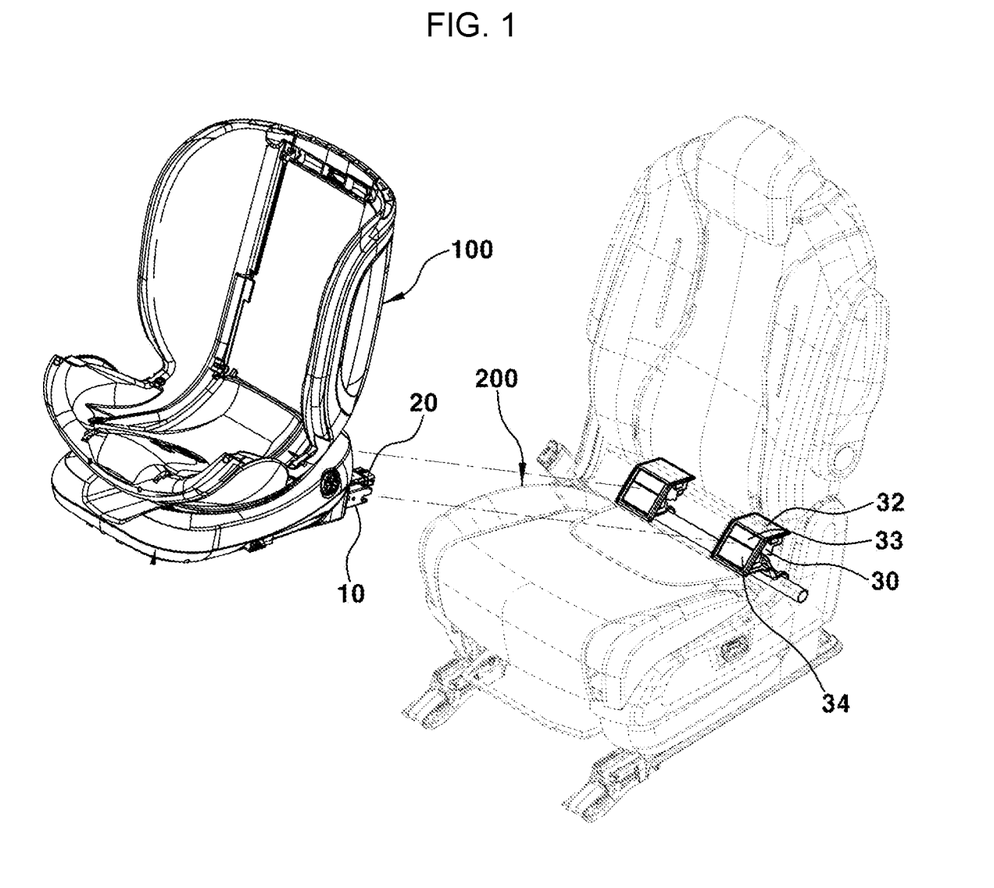
FIG. 1 is a perspective view illustrating the appearance of a power supply device of a motor-driven child seat for a vehicle according to the present disclosure.
Figure 2:
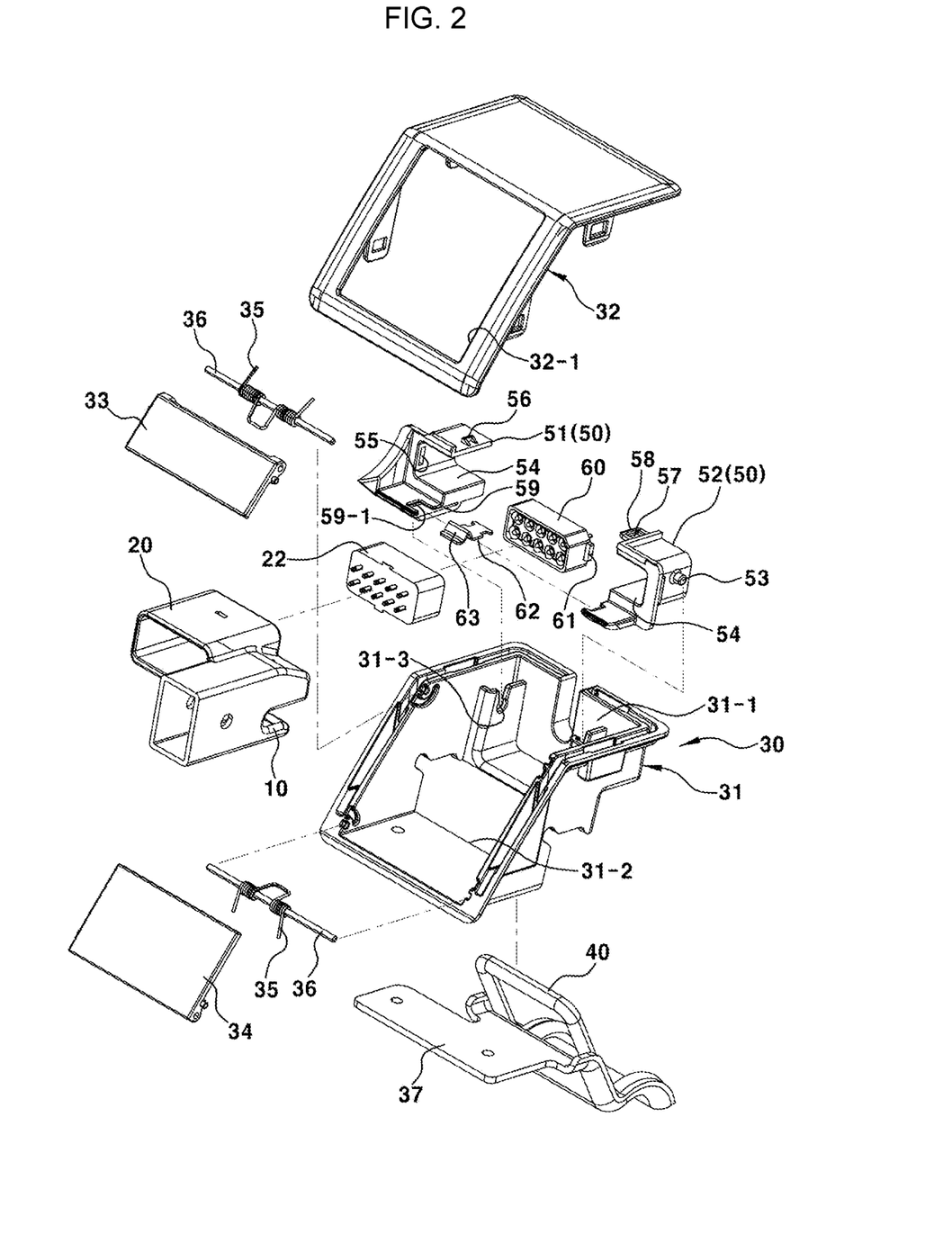
FIG. 2 is an exploded perspective view illustrating the power supply device of the motor-driven child seat for the vehicle according to the present disclosure.

FIG. 1 is a perspective view illustrating the appearance of a power supply device of a motor-driven child seat for a vehicle according to the present disclosure, and FIG. 2 is an exploded perspective view illustrating the power supply device of the motor-driven child seat for the vehicle according to the present disclosure.

As an electric mechanism including a motor for swivel adjustment and reclining adjustment as a power consuming component is installed in a motor-driven child seat, and a ventilation system including an electric fan and a heating system including a heating pad are embedded, a power supply device for easily supplying battery power to each power consuming component is required.

To this end, as shown in FIG. 1, a latch 10 for fixedly mounting the motor-driven child seat is mounted on a lower position of a rear portion of the motor-driven child seat 100, and a case 30 in which the anchor 40 for fastening with the latch 10 is embedded is mounted on a rear portion of a seat cushion of the rear seat 200.

A first connector housing 20 opened at front and rear portions thereof may be integrally injection-molded or mounted on a side of the latch 10, a male connector 22 may be fixedly press-fitted into the first connector housing 20, and a wiring for supplying power to a power consuming component may be connected to a rear portion of the male connector 22.

Preferably, a housing part of the latch 10 and the first connector housing 20 may be integrally injection-molded to simultaneously perform both an operation of locking the latch 10 to the anchor 40 and an operation of fastening the male connector 22 of the first connector housing 20 to the female connector 60.

The case 30 is provided in a structure in which the latch 10 and the first connector housing 20 may enter and exit, and is embedded in the rear portion of the seat cushion of the rear seat 200.

The anchor 40 may be installed at a predetermined position in the case 30, and the female connector 60 may be mounted on a side of the anchor 40 in the case 30 by a second connector housing 50.

Here, a wiring for supplying battery power to the male connector 22 may be connected to a rear portion of the female connector 60.

Therefore, when the latch 10 and the first connector housing 20 are inserted into the case 30, the latch 10 may be fastened to the anchor 40, and simultaneously the male connector 22 is fastened to the female connector 60, so the motor-driven child seat 100 may be easily mounted and fixed to the rear seat 200 in a one-touch manner, and power may be easily supplied to the power consuming component of the motor-driven child seat.

Here, the configuration of the power supply device according to the present disclosure will be described below in detail with reference to FIGS. 2 to 4.

The case 30 may include a lower cover 31 and an upper cover 32 that are fastened to each other.

The lower cover 31 may have an opening 31-1 in a front portion thereof. An anchor exposure hole 31-2 may be formed in a bottom of the lower cover, and hinge fastening grooves 31-3 may be formed on both sidewalls of a rear portion of the lower cover.

The upper cover 32 may be configured to have an access hole 32-1 in a front portion thereof, and may be stacked on and coupled to the lower cover 31 by a clip structure or the like.

Thus, the case 30 including the lower cover 31 and the upper cover 32 may be embedded in the rear portion of the seat cushion of the rear seat 200, and the access hole 32-1 of the upper cover 32 may be exposed to the outside so that the latch 10 and the first connector housing 20 are detachably inserted.

At this time, when the access hole 32-1 of the upper cover 32 is exposed to the outside while being still open before the latch 10 and the first connector housing 20 are inserted, various impurities may enter the case 30 through the access hole 32-1. In order to solve this problem, an openable door is preferably installed in the access hole 32-1.

To this end, an upper end of an upper door 33 may be mounted on an upper portion of the opening 31-1 of the lower cover 31 to be opened or closed by a rotating shaft 36 having a return spring 35. Further, a lower end of a lower door 34 may be mounted on a lower portion of the opening 31-1 of the lower cover 31 to be opened or closed by the rotating shaft 36 having the return spring 35.

Figure 4:
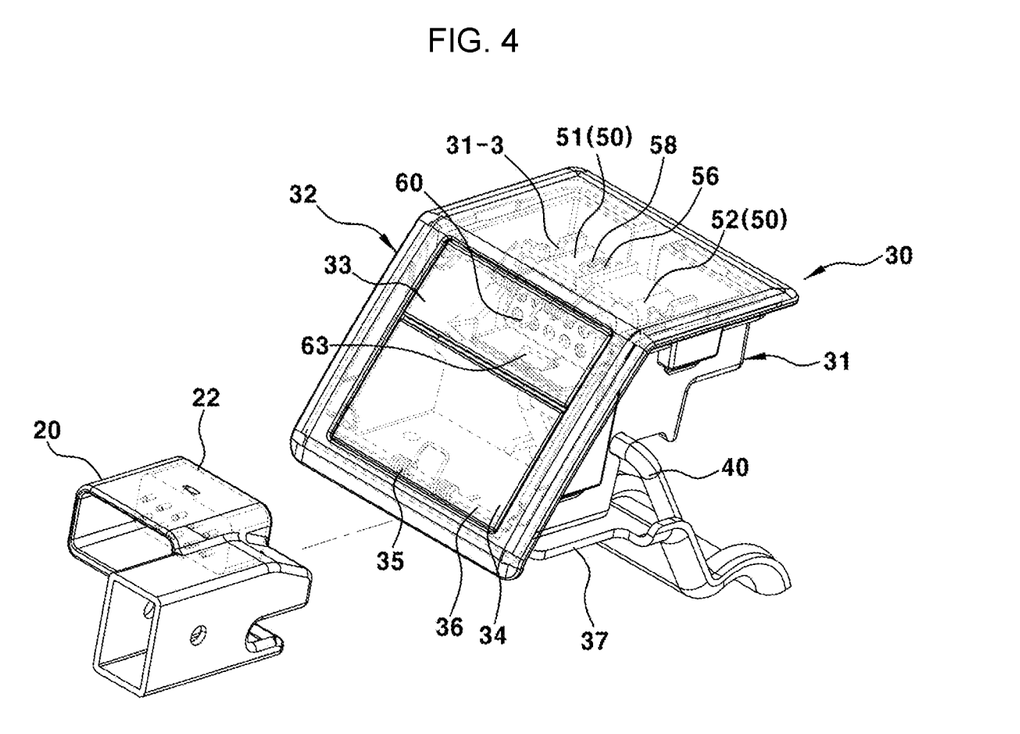

Thus, since the upper door 33 and the lower door 34 mounted, respectively, on the upper portion and the lower portion of the opening 31-1 of the lower cover 31 normally, close the access hole 32-1 of the upper cover 32 as shown in FIG. 4, it is possible to prevent various impurities from entering the case 30 through the access hole 32-1.

On the other hand, the upper door 33 may be rotated upward to be opened and simultaneously the lower door 34 is rotated downward to be opened by a pressing force when the latch 10 and the first connector housing 20 are inserted into the access hole 32-1 of the upper cover 32. Thus, the latch 10 and the first connector housing 20 may be easily inserted into the case 30 through the access hole 32-1.

Further, an anchor bracket 37 may be mounted on the bottom of the lower cover 31, and an annular anchor 40 may be mounted on the anchor bracket 37 via welding to be exposed through the anchor exposure hole 31-2 of the lower cover 31, so the latch 10 inserted into the access hole 32-1 may be easily fastened to the anchor 40.

Meanwhile, the second connector housing 50 in which the female connector 60 is embedded is hingedly fastened to the hinge fastening groove 31-3 of the lower cover 31.

To this end, the second connector housing 50 may include a 2-1 connector housing 51 and a 2-2 connector housing 52 that are symmetrical to each other. A hinge pin 53 may be formed on an outer surface of each of the 2-1 connector housing 51 and the 2-2 connector housing 52 to be fastened to the hinge fastening groove 31-3 of the lower cover 31. Each connector housing has an inner space 54 into which a side end of the female connector 60 is inserted and fastened.

Further, a fastening groove 55 may be formed on an inner wall of the inner space 54, and a fastening protrusion 61 fastened to the fastening groove 55 may be formed on an outer surface of the female connector 60.

Furthermore, a locking pin 56 may be formed on an upper portion of the 2-1 connector housing 51 to protrude therefrom, and a locking end 58 having a locking hole 57 into which the locking pin 56 is inserted and fastened may be formed on an upper portion of the 2-2 connector housing 52.

Thus, after both ends of the female connector 60 are inserted into the inner spaces 54 of the 2-1 connector housing 51 and the 2-2 connector housing 52, respectively, the locking pin 56 of the 2-1 connector housing 51 may be fastened to be locked to the locking hole 57 of the locking end 58 of the 2-2 connector housing 52, so the 2-1 connector housing 51 and the 2-2 connector housing 52 are fastened to each other while tightening the female connector 60.

In this case, when the 2-1 connector housing 51 and the 2-2 connector housing 52 are fastened to each other while tightening the female connector 60, the fastening protrusion 61 of the female connector 60 may be inserted and fastened to the fastening groove 55 formed in the inner wall of the inner space 54, thus constraining the forward-backward movement of the female connector 60.

Further, in order to constrain the first connector housing 20 in which the male connector 22 is installed, a locking spring 62 having the shape of a plate spring and an upwardly convex elastic protrusion 63 may be mounted on the bottom of the second connector housing 50.

To this end, a spring fixing groove 59 into which a half of the locking spring 62 in a widthwise direction is inserted and fastened may be formed in an inner surface of a lower end of each of the 2-1 connector housing 51 and the 2-2 connector housing 52 of the second connector housing 50. A cutout 59-1 may be formed in a portion above the spring fixing groove 59 so that the locking spring 62 protrudes upward.

Thus, when the 2-1 connector housing 51 and the 2-2 connector housing 52 are fastened to each other while tightening the female connector 60, a half of the locking spring 62 in the widthwise direction may be inserted and fastened to each spring fixing groove 59, so the elastic protrusion 63 of the locking spring 62 protrudes upward through the cutout 59-1.

Figure 6:
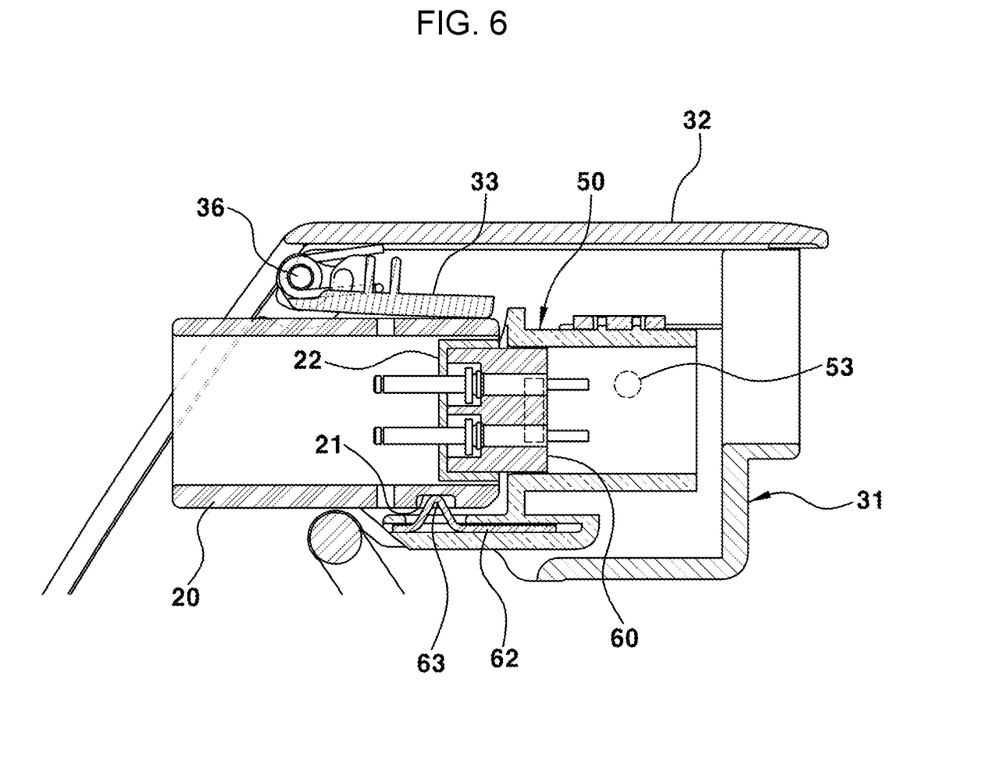

As shown in FIG. 6, a locking groove 21 may be formed in the bottom of the first connector housing 20 so that the elastic protrusion 63 of the locking spring 62 is locked and inserted therein.

Meanwhile, the second connector housing 50 including the 2-1 connector housing 51 and the 2-2 connector housing 52 may be hingedly fastened to the hinge fastening groove 31-3 of the lower cover 31 to be rotatable upward and downward.

Figure 3:
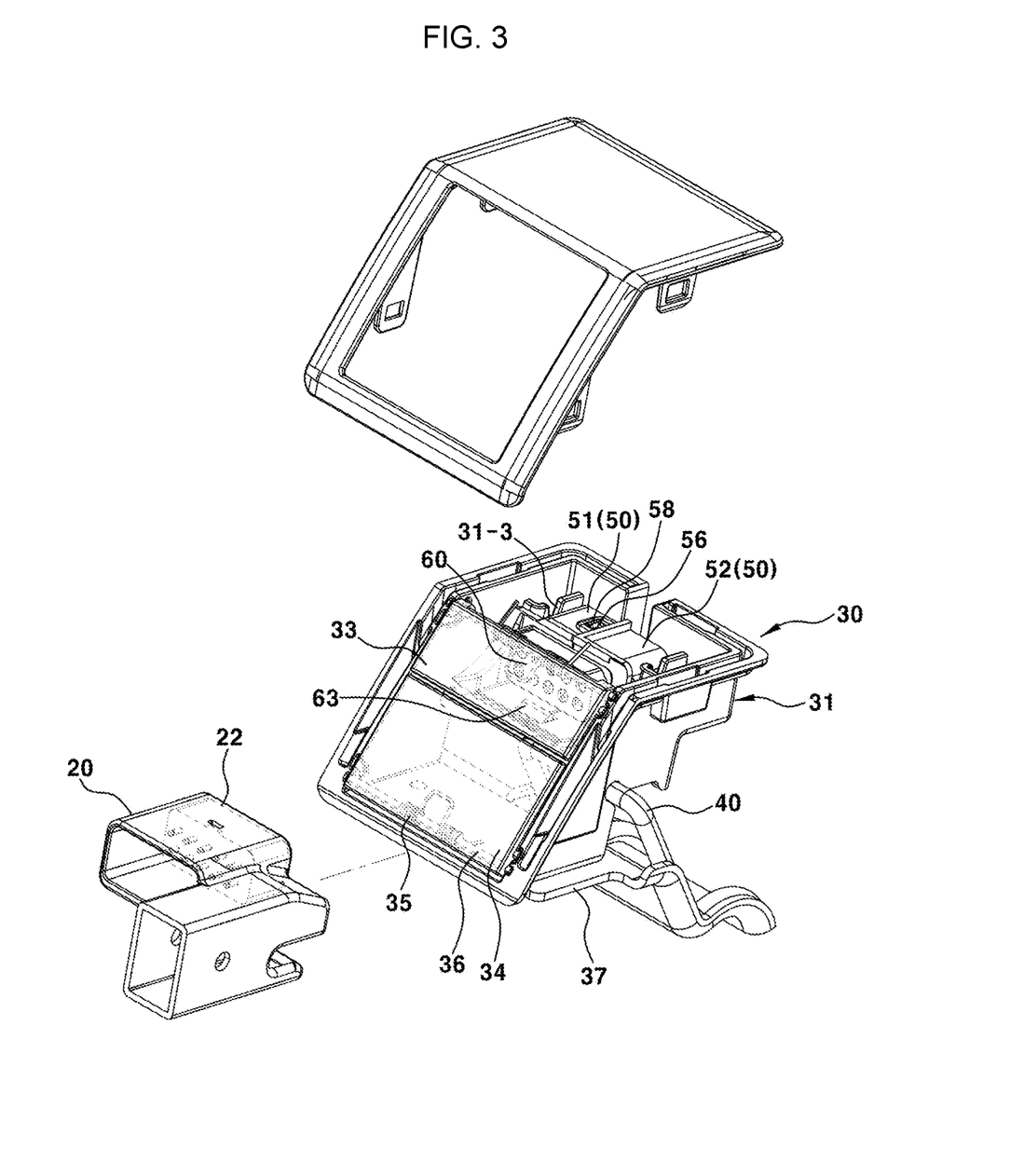
FIGS. 3 and 4 are assembled perspective views illustrating the power supply device of the motor-driven child seat for the vehicle according to the present disclosure.

In other words, as shown in FIG. 3, the hinge pin 53 formed on the outer surface of each of the 2-1 connector housing 51 and the 2-2 connector housing 52 may be fastened to the hinge fastening groove 31-3 of the lower cover 31, thus allowing the second connector housing 50 to be rotatable upward and downward.

Thus, when there is misalignment of a direction in which the male connector 22 installed in the first connector housing 20 is inserted and fastened to the female connector 60 installed in the second connector housing 50, that is, the female connector 60 tightened and fixed by the 2-1 connector housing 51 and the 2-2 connector housing 52, it is possible to precisely adjust the inserting and fastening direction of the male connector 22 to the female connector 60, by upwardly and downwardly rotating the second connector housing 50 about the hinge pin 53.

Here, the use state of the power supply device according to the present disclosure configured as described above will be described.

Figure 5:
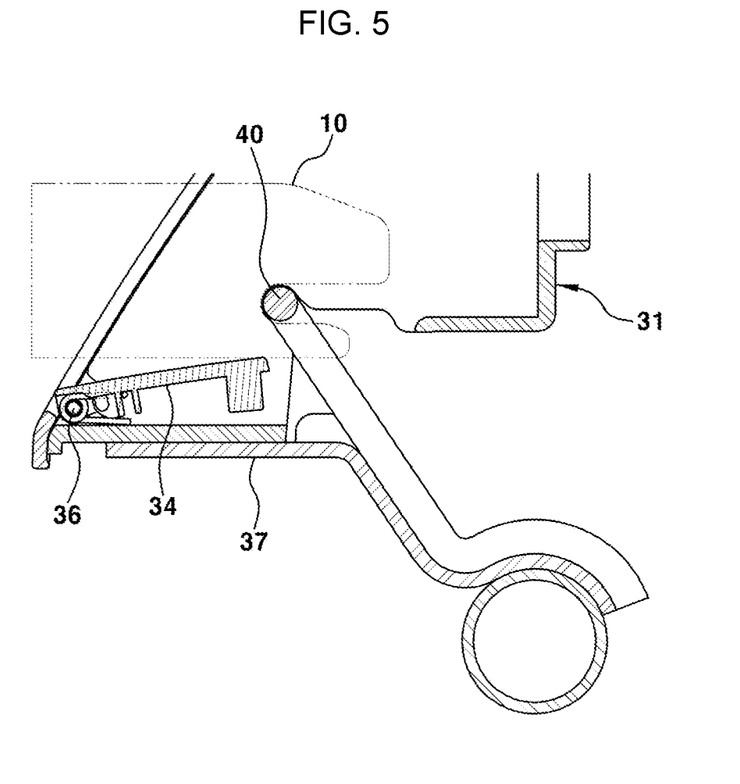
FIGS. 5 and 6 are sectional views illustrating a fastening state of the power supply device of the motor-driven child seat for the vehicle according to the present disclosure.

FIGS. 5 and 6 are sectional views illustrating a fastening state of the power supply device of the motor-driven child seat for the vehicle according to the present disclosure.

First, in a state where the motor-driven child seat 100 is seated on the rear seat 200, the latch 10 and the first connector housing 20 in which the male connector 22 is installed may be inserted into the access hole 32-1 of the upper cover 32.

At this time, the upper door 33 mounted on the lower cover 31 may be rotated upward to be opened and simultaneously the lower door 34 is rotated downward to be opened by a pressing force when the latch 10 and the first connector housing 20 are inserted. Thus, the latch 10 and the first connector housing 20 may be easily inserted into the case 30 through the access hole 32-1.

Subsequently, when the latch 10 and the first connector housing 20 are inserted into the case 30, the latch 10 may be fastened to the anchor 40 as shown in FIG. 5, and simultaneously, the male connector 22 of the first connector housing 20 may be fastened to the female connector 60 mounted on the second connector housing 50 as shown in FIG. 6.

As shown in FIG. 6, the elastic protrusion 63 of the locking spring 62 mounted on the second connector housing 50 may be locked and inserted into the locking groove 21 formed in the bottom of the first connector housing 20, thus preventing the first connector housing 20 from being easily detached, and firmly maintaining a state in which the male connector 22 of the first connector housing 20 is fastened to the female connector 60 mounted on the second connector housing 50.

Therefore, after battery power is transmitted from the female connector 60 to the male connector 22, the power may be easily supplied to the power consuming components (e.g., the electric mechanism including the motor for the swivel adjustment and the reclining adjustment, the ventilation system including the electric fan, the heating system including the heating pad, etc.) connected to the male connector 22.

As such, the motor-driven child seat 100 may be easily mounted and fixed to the rear seat 200 in the one-touch manner, and power may be easily supplied to the power consuming components of the motor-driven child seat.

Although the present disclosure was described with reference to specific embodiments shown in the drawings, it is apparent to those skilled in the art that the present disclosure may be changed and modified in various ways without departing from the scope of the present disclosure, which is described in the following claims.

What is claimed is:

1. A power supply device of a motor-driven child seat for a vehicle, the power supply device comprising:
   a latch mounted on a rear portion of the motor-driven child seat;
   a male connector installed in a first connector housing formed on a side of the latch;
   a case configured to allow the latch and the first connector housing to enter and exit, and configured to be mounted on a rear seat of the vehicle;
   an anchor installed at a predetermined position of the case; and
   a female connector mounted in the case and positioned on a side of the anchor,
   wherein, when the latch and the first connector housing are inserted into the case, the latch is fastened to the anchor, and simultaneously the male connector is fastened to the female connector; and
   wherein the case comprises:
   a lower cover having an opening formed in a front portion thereof,
   an anchor exposure hole formed in a bottom thereof, and
   hinge fastening grooves formed on both sidewalls of a rear portion thereof.

2. The power supply device of claim 1, wherein the case further comprises:
   an upper cover having an access hole formed in a front portion thereof, and stacked on the lower cover to be coupled thereto.

3. The power supply device of claim 2, wherein an upper door and a lower door are mounted, respectively, on an upper portion and a lower portion of the opening of the lower cover to be opened or closed by a rotating shaft having a return spring.

4. The power supply device of claim 2, wherein an anchor bracket is mounted on the bottom of the lower cover, and an annular anchor mounted on the anchor bracket is exposed through the anchor exposure hole.

5. The power supply device of claim 2, wherein the second connector housing in which the female connector is embedded is hingedly fastened to the hinge fastening groove of the lower cover.

6. The power supply device of claim 5, wherein the second connector housing comprises a 2-1 connector housing and a 2-2 connector housing that are symmetrical to each other.

7. The power supply device of claim 6, wherein a hinge pin is formed on an outer surface of each of the 2-1 connector housing and the 2-2 connector housing to be fastened to the hinge fastening groove.

8. The power supply device of claim 7, each of the connector housings comprises an inner space into which the female connector is inserted and fastened.

9. The power supply device of claim 8, wherein a fastening groove is formed on an inner wall of the inner space.

10. The power supply device of claim 9, wherein a fastening protrusion fastened to the fastening groove is formed on an outer surface of the female connector.

11. The power supply device of claim 8, wherein a locking pin is formed on an upper portion of the 2-1 connector housing to protrude therefrom.

12. The power supply device of claim 11, wherein a locking end having a locking hole into which the locking pin is inserted and fastened is formed on an upper portion of the 2-2 connector housing.

13. The power supply device of claim 8, wherein a locking spring locked and inserted into a locking groove formed in the bottom of the first connector housing is mounted on the bottom of the second connector housing to protrude therefrom.

14. The power supply device of claim 13, wherein a spring fixing groove into which a half of the locking spring in a widthwise direction is inserted and fastened is formed in an inner surface of a lower end of each of the 2-1 connector housing and the 2-2 connector housing of the second connector housing.

15. The power supply device of claim 1, wherein a housing part of the latch and the first connector housing are integrally injection-molded to simultaneously perform both an operation of locking the latch to the anchor and an operation of fastening the male connector of the first connector housing to the female connector.

16. A vehicle comprising the power supply device of claim 1.

* * * * *